US007455882B2

(12) United States Patent
Gibbons et al.

(10) Patent No.: US 7,455,882 B2
(45) Date of Patent: Nov. 25, 2008

(54) METHOD OF APPLYING ADHESIVE TO ELECTROCHEMICAL CELL COMPONENTS

(75) Inventors: Daniel W. Gibbons, Southbury, CT (US); Michael Brovarski, Monroe, CT (US); Leo White, Bristol, CT (US)

(73) Assignee: The Gillette Company, Boston, MA (US)

( * ) Notice: Subject to any disclaimer, the term of this patent is extended or adjusted under 35 U.S.C. 154(b) by 672 days.

(21) Appl. No.: 10/939,701

(22) Filed: Sep. 13, 2004

(65) Prior Publication Data

US 2006/0057286 A1 Mar. 16, 2006

(51) Int. Cl.
*B05D 5/10* (2006.01)
*B05D 7/22* (2006.01)
*B05B 13/06* (2006.01)

(52) U.S. Cl. .................. 427/207.1; 427/230; 427/231; 118/52; 118/53; 118/54; 118/55; 118/318; 118/320

(58) Field of Classification Search .................. 427/231; 118/52–55, 318, 320
See application file for complete search history.

(56) References Cited

U.S. PATENT DOCUMENTS

| | | | | |
|---|---|---|---|---|
| 3,420,208 A * | 1/1969 | Guthrie | ....................... | 118/683 |
| 4,465,212 A | 8/1984 | Boone | | |
| 4,579,255 A | 4/1986 | Frates | | |
| 4,922,852 A | 5/1990 | Price | | |
| 4,988,015 A | 1/1991 | Price | | |
| 5,078,325 A | 1/1992 | Waryu | | |
| 5,277,344 A | 1/1994 | Jenkins | | |
| 6,164,568 A | 12/2000 | Muller | | |
| 6,244,522 B1 | 6/2001 | Reighard | | |
| 6,352,747 B1 * | 3/2002 | Blackburn et al. | .......... | 427/425 |
| 6,436,156 B1 | 8/2002 | Wandeloski | | |
| 6,610,353 B1 * | 8/2003 | Gibbons et al. | ............... | 427/58 |
| 2001/0052585 A1 | 12/2001 | Righolt | | |

OTHER PUBLICATIONS

EFD 725D series piston valve installation guide, retrieved from www.efd-inc.com/manulas.html.*
EFD 725D Series Piston Valve Installation Guide.

* cited by examiner

*Primary Examiner*—William Phillip Fletcher, III
*Assistant Examiner*—Cachet I Sellman
(74) *Attorney, Agent, or Firm*—Barry D. Josephs; Kevin C. Johnson; Leo J. White (57) ABSTRACT

A method of applying liquid adhesive to surfaces of components of an electrochemical cell employing a needle valve applicator. The liquid adhesive is applied by dispensing it through a tubular tip connected to a pneumatically actuated needle valve applicator. The method is effective in applying adhesive to narrow width or difficult to reach surfaces of cell components in a precise, consistent and reproducible manner. In a specific application the adhesive can be applied to the narrow recessed step surrounding the terminal portion of the cathode casing of a zinc/air button cell. In such application the cathode casing may typically be rotated at speeds of between about 50 and 1000 revolutions per minute as adhesive is applied thereto from the applicator. The adhesive provides a tight seal between the cathode casing and cathode assembly, thereby preventing leakage of electrolyte from the cell.

9 Claims, 6 Drawing Sheets

FIG. 4

METHOD OF APPLYING ADHESIVE TO ELECTROCHEMICAL CELL COMPONENTS

FIELD OF THE INVENTION

The invention relates to a method of applying adhesive to components of an electrochemical cell employing a needle valve applicator. In particular the invention relates to a method of applying adhesive to the inside surface of the cathode casing of a zinc/air cell employing a pneumatically actuated needle valve applicator having a tubular dispense tip attached thereto.

BACKGROUND

There is a need to apply adhesive to electrochemical cell components, for example, portions of the inside surface of the casing for the cell. The portions of surfaces to be coated with adhesive can be very narrow or otherwise difficult to access using convention brushes or contact rollers. Many cells, such as conventional zinc/$MnO_2$ alkaline cells include a plastic insulating plug which is inserted into an open end of the cell casing (housing) to seal the cell. There can be desirable benefits to applying adhesive sealant between the edge of such insulating plug and the cell casing, which is typically metallic. In such cells a metallic current collector in the form of an elongated nail is inserted through an aperture in the insulating plug so that the tip of the current collector passes into the anode mixture. It can be useful to apply adhesive sealant to the surface of the current collector or the insulating plug so that a tight seal develops when the current collector is inserted into the insulating plug. Conventional contact methods of applying the adhesive, for example, with brushes or rollers are usually slow or are difficult to apply to very narrow or difficult to reach surfaces.

Zinc/air depolarized cells are typically in the form of miniature button cells which have particular utility as batteries for electronic hearing aids including programmable type hearing aids. There can be a problem of leakage of electrolyte from such cells if they are not propely sealed, particulary if the cell is misused. Such miniature cells typically have a disk-like cylindrical shape of diameter between about 4 and 12 mm and height between about 2 and 6 mm. Zinc air cells can also be produced in somewhat larger sizes having a cylindrical casing of size comparable to conventional AAAA, AAA, AA, C and D size Zn/$MnO_2$ alkaline cells and even larger sizes.

The miniature zinc/air button cell typically comprises an anode casing (anode cup), and a cathode casing (cathode cup). The anode casing and cathode casing each have a closed end an open end. After the necessary materials are inserted into the anode and cathode casings, the open end of the cathode casing is typically inserted over the open end of the anode casing and the cell sealed by crimping. The anode casing can be filled with a mixture comprising zinc, usually particulate zinc, with mercury optionally added to reduce gassing. The electrolyte is usually an aqueous solution of potassium hydroxide, however, other aqueous alkaline electrolytes can be used. The closed end of the cathode casing (when the casing is held in vertical position with the closed end on top) can have a raised portion near its center or a flat bottom. This portion forms the positive terminal and typically contains a plurality of air holes therethrough. Cathode casings with a raised center on the closed end usually have an integrally formed annular recessed step, which extends from and surrounds the raised positive terminal.

The catode casing contains an air diffuser (air filter) which lines the inside surface of the raised portion (positive terminal contac area) at the casing's closed end. The air diffuser is palced adjacent to air holes in the raised portion of the casing closed end. Catalytic material typically comprising a mixture of particulate manganese dioxide, carbon and hydrophobic binder can be inserted into the cathode casing over the air diffuser on the side of the air diffuser not contacting the air holes. The cathode material can be part of a cathode catalytic assembly which is inserted into the cathode casing so that it covers the air diffuser (filer). The cathode catalyc assembly can be formed by laminating a layer of electrolyte barrier material (hydrophobic air permeable film), preferably TEFLON polymer (tetrafluoroethylene), to one side of the catalytic material and an electrolyte permeable (ion permeable) separator material to the opposite side. The cathode catalytic assembly is then typically inserted into the cathode casing so that its central portion covers the air diffuser and a portion of the electrolyte barrier layer rests against the inside surface of the step.

In high drain or other demanding services, electrolyte can migrate to the edge of the catalytic cathode assembly and leakage of electrolyte from the cathode casing can occur. The leakage, if occurring, tends to occur along the peripheral edge of the cathode catalytic assembly and the cathode casing and then gradually seep from the cell through the air holes at the cathode casing closed end. The potential for leakage is also greater when the cathode casing is made very thin. For example, having a wall thickness of between about 4 and 10 mil (0.102 0.254 mm) or lower, for example, between about 2 and 6 mil (0.051 and 0.152 mm) in order to increase the amount of available internal volume. There is a greater tendency for the thin walled cathode casing to relax after crimping closes the cell. Such casing relaxation can result in the development or enlargement of microscopic pathways between the cathode catalytic assembly and the inside surface of cathode casing step, in turn providing a pathway for electrolyte leakage.

In commonly assigned U.S. Pat. No. 6,436,155 B1 a pad transfer method is disclosed for applying a narrow band of adhesive to the recessed annular step surrounding the raised terminal portion of the cathode casing of a zinc/air cell. The application of adhesive to the inside surface of the recessed step provides a tight seal between the cathode assembly and cathode casing of a zinc/air cell. The adhesive applied by pad transfer method prevents leakage of electrolyte around the edge of the cathode assembly and thus prevents electrolyte from escaping through air holes in the cathode casing.

In commonly assigned U.S. Pat. No. 6,610,353 B1 a jet spray method is disclosed for applying adhesive to electrochemical cell components and casing. The nozzle assembly comprises a nozzle having a resilient glass capillary tube surrounded by a piezoelectric transducer. The piezoelectric transducer causes the capillary tube to pulse (vibrate) thereby causing liquid adhesive passing therethrough to dispense from the nozzle in the form of micro sized droplets. In particular the jet spray method allows application of very narrow band of adhesive to the recessed step surrounding the raised terminal portion of the cathode casing of a zinc/air cell.

Another method which has been used to dispense fluids, including liquid adhesives, is through use of a needle valve applicator. Such method employs a pneumatically actuated needle valve which allows fluid to pass through a tubular tip connected to the valve. Needle valve applicators have been used to apply adhesive in globs to specific portions of cell components or specific regions of the cell casing. They have been generally considered ineffective for accurate application of very narrow continuous bands of adhesive, e.g. band widths less than about 30 mil (0.76 mm), particularly when the application path is curvilinear. Representative needle valve applicator patents are: U.S. 2001/0052585A1; U.S. Pat. Nos. 6,244,522 B1; 6,164,568; 5,277,344; 5,078,325; 4,988,015; 4,922,852; and 4,579,255.

SUMMARY OF THE INVENTION

An aspect of the invention is directed to a method for applying a liquid adhesive to components of an electrochemical cell, particularly a portion of the inside surface of the casing for such cell, through use of a needle valve actuated applicator. The adhesive is dispensed preferably through a tubular tip connected to a pneumatically actuated needle valve within the applicator housing while the surface being coated is rotated beneath the applicator dispense tip. The term "needle valve" as used herein for an applicator is characterized by having a needle-like rod which functions as valve or valve component within the applicator. The rod is an axially moveable elongated member, typically of needle-like shape, connected to a piston. The distal end of the rod may be conically shaped, similar to a needle tip, in order to engage a frustoconical seat to close the valve. However, the rod distal end may be of other shapes as well to engage seats of varying shape. The distal end of the rod typically engages the inlet end of a tubular dispense tip. The needle rod, which may simply be referenced herein as the "needle", can move axially as by pneumatic actuation of the piston. When the valve is closed, the distal end of the rod engages and seats on the inlet end of the tubular dispense tip, thus preventing liquid adhesive from passing therethrough. When the valve is opened, that is, when the distal end of the rod unseats from the inlet end of the tubular dispense tip, liquid adhesive flows though the dispense tip to the electrochemical cell component or casing surface being coated. The needle or needle rod may "seat" on a mating surface which can be located in the dispensing tip or within the valve body. The needle valve within the applicator can be preset to open for a desired period of time to enable application of adhesive to a specific surface being coated, for example, as the surface is rotated beneath the applicator.

It has been determined that recent improvements in the design of commercial needle valve actuated applicators including improvements in the tubular dispense tips attached thereto, now allow for accurate dispensing of fluids in very narrow widths. Moreover, the valve opening times (dispense times) may now be set to very small periods, for example, less than about 0.8 second, such as between about 0.1 and 0.6 seconds. The valve opening time can be set to even shorter periods, for example to about 0.05 second. It has been determined that liquid adhesives, such as solvent based adhesive solutions or dispersions, may now be dispensed in very narrow bands in widths less than about 30 mils (0.76 mm), for example, between about 10 and 25 mil (0.254 and 0.635 mm). Specifically, it has been determined that a solvent based adhesive may be dispensed accurately in such very narrow bands during valve opening times which may be short, for example between about 0.1 and 0.6 seconds. In particular it has been determined that such very narrow bands of adhesive may be dispensed in a straight or continuous curvilinear path, for example, in an arcuate or circumferential path, onto the surface of a portion of an electrochemical cell casing through use of a needle valve applicator. In particular the liquid adhesive can now be dispensed in one or more circumferential continuous bands having narrow widths preferably between about 10 and 25 mil (0.0254 and 0.635 mm) onto a specific surface of an electrochemical cell casing rotating beneath the applicator.

The pneumatically actuated needle valve applicator is characterized by having a pneumatically actuated needle valve piston assembly connected to a tubular dispense tip. A supply of air under a pressure of between about 70 and 90 psi is input to the piston assembly. The valve is preset to open for a specific period of time per dispense cycle, allowing a continuous flow of adhesive (or other fluid) to be dispensed from the tubular dispense tip during that period. The piston assembly comprises a piston, a needle-like piston rod connected thereto, a piston spring, and packing around the needle rod. The applicator also includes a replaceable dispense tip assembly which is attached to the valve. The dispense tip assembly has a fine tubular dispense tip housed therein. The distal end of the needle rod seats on the inlet end of the tubular dispense tip. A liquid adhesive (or other fluid) is supplied from an external vat to an internal dispense chamber located at the junction of the needle rod and tubular dispense tip. The valve is attached to an electronic controller which can be preset to achieve a specific valve opening time per cycle of dispense operation. Air is pulsed into the air inlet chamber for the desired valve opening time. During the valve opening time the needle rod end unseats from the inlet end of the tubular dispense tip, thus opening the valve and allowing adhesive to pass through the dispense tip and onto the receiving surface. At the end of the cycle air pressure is pulsed off causing the piston spring to return the needle rod to its seat blocking the inlet to the tubular dispense tip.

In a specific application herein, during a preset valve opening time a zinc/air cell cathode casing can is spun one revolution on a revolving turret and a continuous band of adhesive is dispensed during that period from the needle valve actuated applicator. The cathode casing is spun one revolution at a rate corresponding to the preset valve opening time. During the valve opening time the needle rod unseats from the inlet to the tubular dispense tip allowing a narrow continuous band of adhesive to dispense therefrom. In this manner a continuous band of adhesive can be applied in a ring to the inside surface of the recessed annular step surrounding the raised terminal portion of the cathode casing of a zinc/air cell. Alternatively, the cathode casing may be fixed and the adhesive may be dispensed from the needle valve applicator attached to a turret which revolves in an orbital path over the cathode can. Preferably the adhesive is applied to the cathode casing step in a width of about 10 and 50 mil (0.0254 and 1.27) preferably between about 10 and 25 mil (0.0254 and 0.635 mm). For such application the tubular dispense tip connected to the needle valve within the applicator desirably has an inside diameter less than 8 mils (0.20 mm), preferably, between about 4 and 6 mils (0.10 and 0.15 mm). A dispense cycle time (valve opening time) between about 0.1 and 0.5 seconds per cycle allows adhesive to be applied in a continuous ring to between about 30 and 100 cathode can annular steps per minute.

Two recent advances in design of pneumatically actuated needle valve fluid dispensers have permitted dispensing adhesive fluids in very narrow widths within Applicants requirements, namely between about 10 and 50 mil (0.0254 and 1.27) preferably between about 10 and 25 mil (0.0254 and 0.635 mm). The first advance permitted the end of the needle rod to seat within the tubular tip assembly and in direct contact with the tubular dispense tip. The direct contact of the needle rod end to the tubular dispense tip, that is, allowing the needle rod to seat directly at the tubular dispense tip inlet end, results in greater control over the amount of fluid that passes through dispense tip and helps make it possible to dispense the fluid in very narrow widths. The seat of the needle end rod in contact with the inlet end of the tubular dispense tip makes possible the second advance, namely, use of a tubular dispense tip having very small apertures running therethrough. For example, tubular dispense tips having inside diameters under 8 mils (0.20 mm), for example, between about 4 and 6 mils (0.10 and 0.15 mm) may be inserted into the replaceable tubular tip assembly which may be connected to the needle valve within the applicator.

It has been determined that the use of such pneumatically actuated needle valve having tubular dispense tips of inside diameter less than 8 mil (0.20 mm), preferably between about 4 and 6 mils (0.10 and 0.15 mm) attached thereto, permits application of a continuous circumferential band of adhesive, preferably a solvent based adhesive, to the inside surface of the annular recessed step surrounding the raised terminal portion of the cathode casing of a zinc/air cell. The adhesive can be applied in this manner in continuous very narrow circumferential bands to the recessed step of the cathode casing of a zinc/air cell. Specifically, the adhesive may be applied to such recessed step of the zinc/air cell cathode casing in the required narrow band width of between about 10 and 50 mil (0.0254 and 1.27), preferably between about 10 and 25 mil (0.0254 and 0.635 mm) while the cathode casing is rotated at high speeds, for example, between about 100 and 600 revolutions per minute beneath the dispense applicator.

A preferred adhesive is a solvent-based solution comprising polyamide adhesive resin. The adhesive component is desirably a low molecular weight thermoplastic polyamide resin. Preferred polyamide resins are available under the tradenames REAMID-100 and VERSAMID-100 (General Mills Chemicals). These resins are gels at room temperature that are dimerized fatty acids with molecular weights around 390 and are the reaction products of dimerized fatty acids and diamines. Although higher molecular weight polyamide based adhesive components can be used, the lower weight components are preferred since they are more readily dissolved in the preferred solvent of choice. The adhesive component is dissolved in a solvent to the desired viscosity. Various solvents can be used, such as isopropanol or toluene, as well as mixtures of solvents. The preferred embodiment uses isopropanol as the solvent of choice due to its relative benign nature. An additional advantage of polyamides is their resistance to chemical attack by potassium hydroxide electrolyte.

The adhesive can be effectively applied to electrochemical cell components employing the needle valve application method herein described. The adhesive can be applied to provide an adhesive seal between desired surfaces of polymer components, between surfaces of metallic components or between surfaces of polymer and metallic components for the cell. For example, the adhesive can be applied to provide an adhesive seal between a plastic insulating plug and outer casing of an electrochemical cell to seal the open end of a metallic or plastic casing of a cylindrical or flat (prismatic) alkaline cell. In such cells there is typically an elongated current collector (nail) which is inserted through the insulating plug so that its tip penetrates into one of the electrode mixtures. For example, in zinc/$MnO_2$ alkaline cells there is usually an elongated current collector nail inserted through an opening in the insulating plug so that it penetrates into the zinc anode mixture. Liquid adhesive can be applied around the surface of such current collector by the needle valve application method herein described so that an adhesive seal develops between the current collector and insulating plug. Alternatively, the sealant can be applied to the walls of the aperture in the insulating plug.

A particular aspect of the invention is directed a method of applying liquid adhesive through use of a pneumatically actuated needle valve applicator to a portion of the inside surface of a cathode casing for a zinc/air cell. In a specific application the adhesive can be applied to the inside surface of an annular recessed step surrounding the raised terminal end portion of the cathode casing of a zinc/air cell. The adhesive is preferably applied in a continuous band to said recessed step as the cathode casing is rotated beneath the applicator dispense tip. Preferably, the adhesive is dispensed onto said annular step of the cathode casing in a narrow band having a width between about 10 mil and 50 mil (0.254 and 1.27 mm), preferably between about 10 and 25 mil (0.254 mm and 0.635 mm). The width of the adhesive must be less than the width of the recessed step. Otherwise there is the chance that some adhesive will be applied to the cathode vertical side wall extending from and in immediate proximity to said step. Placement of adhesive on such vertical side wall must be avoided since it will interfere with achieving the required good electrical contact between the cathode assembly and the casing side wall. The adhesive, upon drying, acts as a sealant to prevent leakage of electrolyte from the cell. If the closed end of the cathode casing is flat, that is, does not have a recessed step, the adhesive can be applied preferably in a continuous band to the inside surface of the closed end along or near its peripheral edge.

BRIEF DESCRIPTION OF THE DRAWINGS

The invention will be better understood with reference to the drawings in which.

DETAILED DESCRIPTION

The needle valve applicator method of the invention may be used to apply adhesive to components of an electrochemical cell during assembly of the cell. Most cells include a plastic insulating plug, which is inserted into an open end of the cell casing (housing) to seal the cell and prevent electrical shorting. The casing is typically metallic. The adhesive may be applied between the edge of such insulating plug and the cell casing. A metallic current collector typically in the form of an elongated nail is inserted through an aperture in the insulating plug so that the tip of the current collector passes into the anode mixture. Adhesive may be applied by the needle valve applicator method herein described to the surface of current collector to produce an adhesive seal between the anode current collector and insulator plug.

In a particular application the adhesive may be applied by the needle valve applicator to portions of surfaces within the cathode casing (cathode can) of a zinc/air cell. The term "needle valve" as used herein for a dispense applicator is characterized by comprising a needle-like rod which functions as valve or valve component within the applicator. The rod is an elongated member typically connected to a piston. The distal end of the rod may be conically shaped, similar to a needle tip, in order to engage a frustoconical seat to close the valve. However, the distal end of the needle rod may be flat or of other shapes to engage seats of varying shape. The rod is typically of small diameter, for example, less than about 5 mm, more typically less than about 2 mm. The needle rod is axially moveable within the applicator housing responsive to movement of the piston. In particular it has been determined that adhesive can be advantageously applied by needle valve applicator to the inside surface of the closed end of the cathode casing (cathode can) of a zinc/air cell. In a specific embodiment the adhesive can be applied by the needle valve applicator method to the peripheral recessed step surrounding the raised terminal contact portion of conventional cathode casing of zinc/air button cells. If the closed end of the cathode casing is flat, that is, does not have a recessed step, the adhesive sealant can be applied by needle valve applicator to the inside surface of the closed end along, near or adjacent its peripheral edge.

Figure 1:
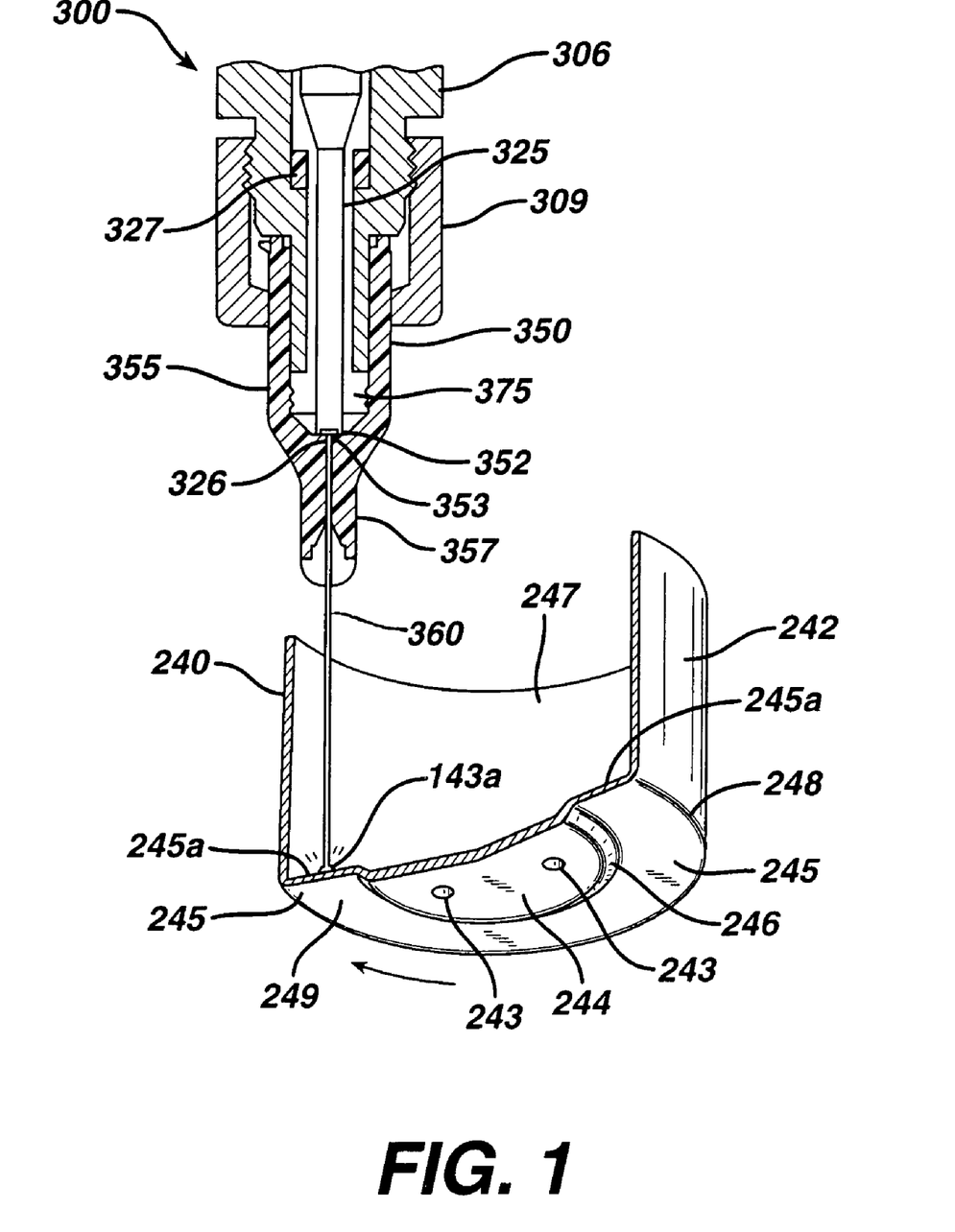
FIG. 1 is a pictorial view showing the application of liquid adhesive sealant dispensed from a pneumatically actuated needle valve applicator to the recessed step at the closed end of the cathode casing for a zinc/air cell.

In a specific embodiment the application of adhesive to the inside surface 245a of recessed annular step 245 at the closed terminal end 244 of a cathode can 240 for a zinc/air cell is shown in FIG. 1. The adhesive 143a is applied over at least a major portion of step 245 and preferably in a continuous circumferential band over step 245 by the pneumatically actuated needle valve applicator 300.

Figure 2:
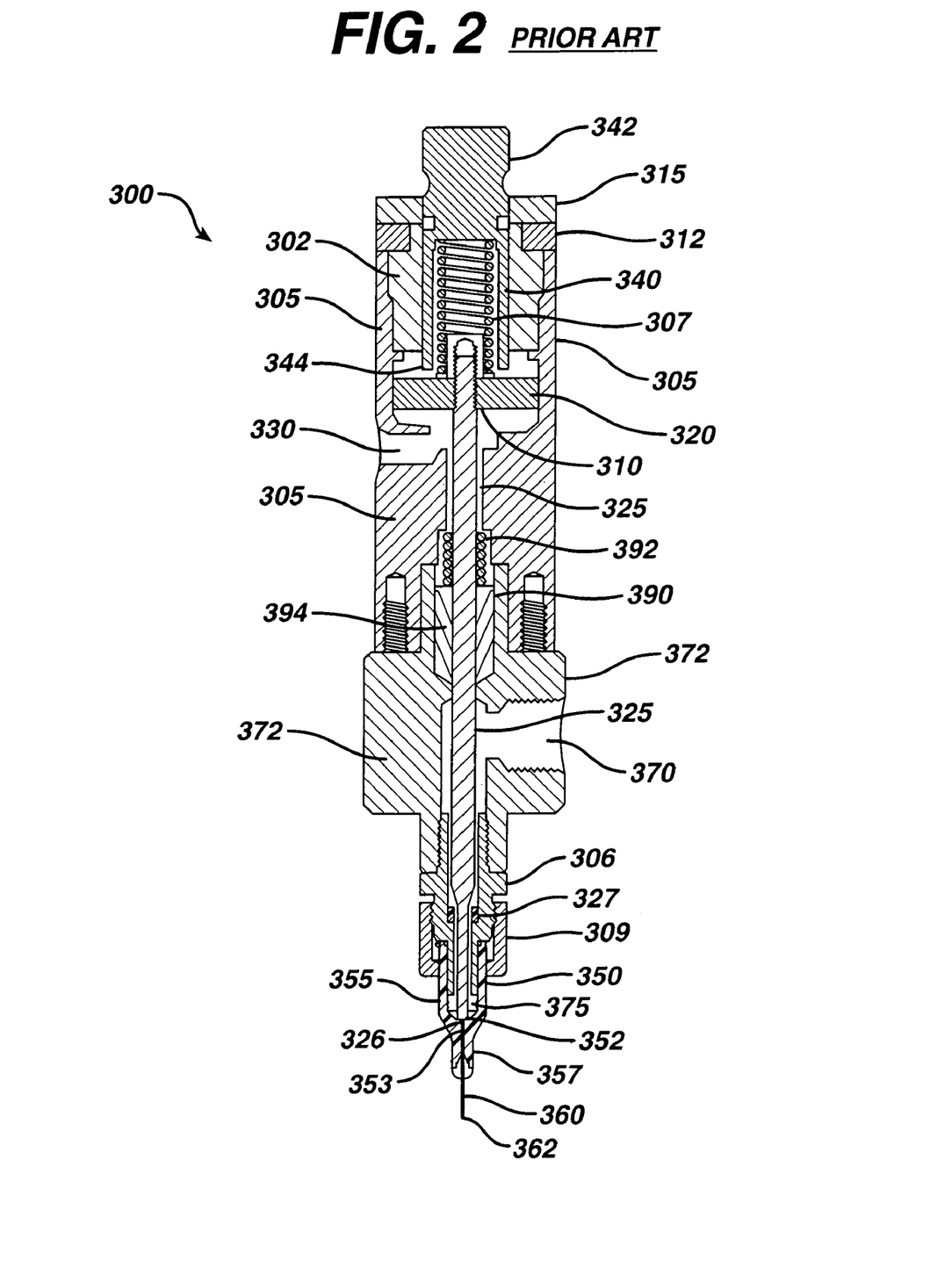
FIG. 2 is a cross sectional view of a needle valve applicator for dispensing adhesive sealant to the recessed step of a cathode casing for a zinc/air cell.

As shown best in FIG. 2 the needle valve applicator comprises a main cylindrical housing 305, a needle valve piston assembly 310, an air inlet chamber 330, a dispense fluid (liquid adhesive) inlet chamber 370, a piston spring assembly 340, needle rod packing 394, packing spring 392, and a replaceable dispense tip assembly 350 housing a tubular dispense tip 360 therein. The air inlet chamber 330 is within the main housing 305 and the fluid (adhesive) dispense chamber 370 is within housing 372 which is shown bolted to main housing 305. A fluid adhesive is supplied under pressure to inlet dispense chamber 370 and it passes along the lower surface of needle rod 325 to fill lower dispense chamber 375. The needle valve piston assembly 310 comprises a cylindrical piston 320, connected to a needle-like piston rod 325. When air pressure to air inlet chamber is lowered to a minimum threshold level or else reduced to ambient pressure, the distal end 326 of needle rod 325 is seated firmly on the inlet end 352 of tubular dispense tip 360. The downward pressure of piston spring 307 keeps the distal end 326 of needle rod 325 firmly seated against the inlet 352 of tubular dispense tip 360. The distal end 326 of rod 325 may be conically shaped similar to a needle tip to engage and seat on dispense tip inlet 352 which may have a frustoconical shape. When needle rod distal end 326 is so seated, the inlet end 352 of the tubular dispense tip is blocked (valve closed) keeping adhesive from dispensing therethrough.

As air under elevated pressure is pulsed into air inlet chamber 330 for a set period, piston 320 and needle rod 325 moves axially upward pushing against piston spring 307. The upward action of piston 320 opens the valve 353, that is, lifts needle rod 325 off of its seat 352. During the valve opening time, pressurized liquid adhesive flows from the lower adhesive dispense chamber 375 through tubular dispense tip 360 and passes from the dispense tip outlet 362 to the surface being coated. The adhesive can be dispensed in a single glob or dot on the receiving surface. Alternatively, the receiving surface may be rotated beneath dispense tip 360 at a speed in timing with the needle valve opening time in which case the adhesive may be dispensed in an arcuate or circumferential band on the receiving surface.

Figure 2A:
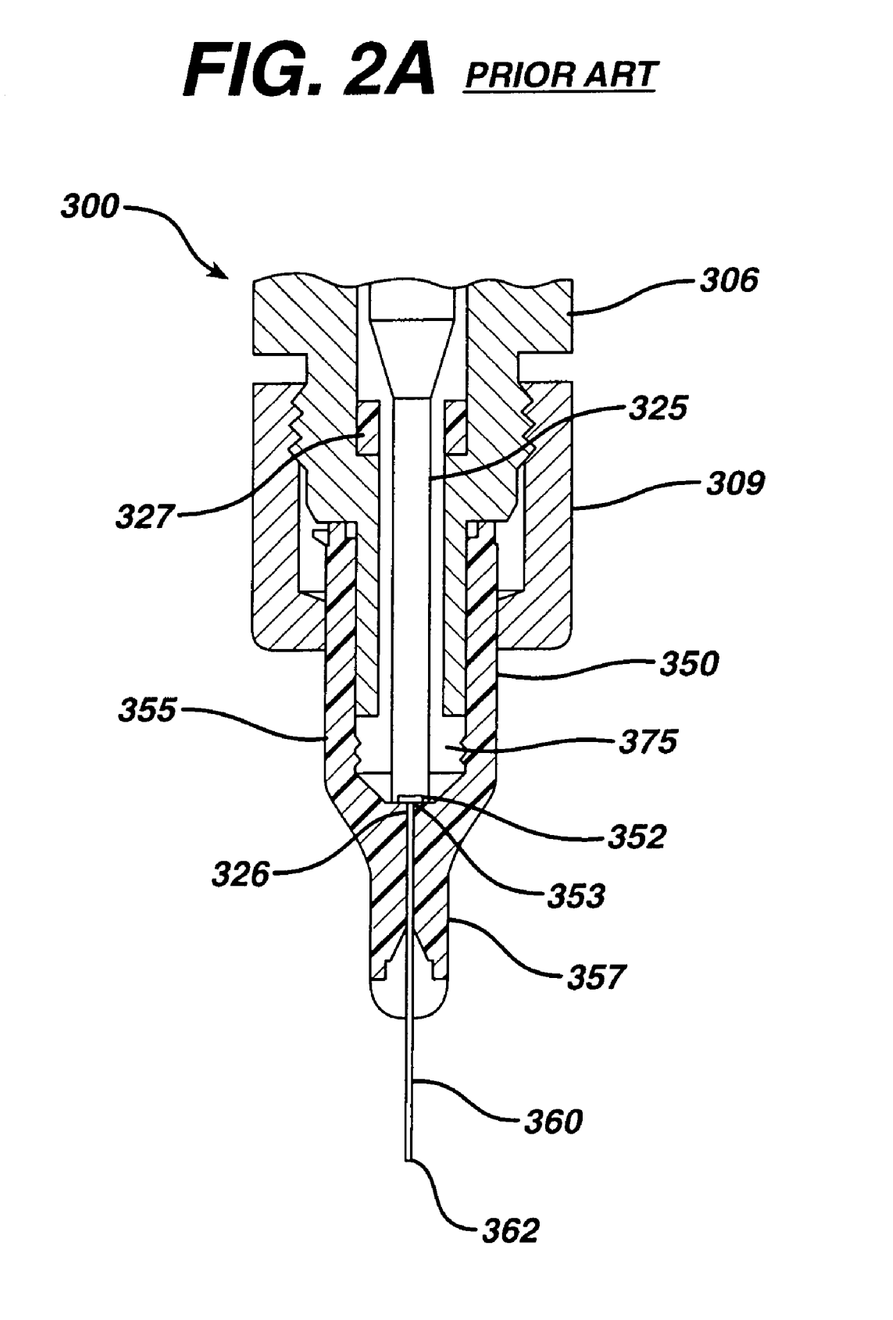
FIG. 2A is an enlarged isometric cross sectional view of the needle valve seat and replaceable tube tip assembly attached thereto.

The above described type of needle valve applicator 300 is generally available from EFD Company, a Nordson Company. A modern version of the needle valve applicator has a replaceable dispense tip assembly 350 with tubular dispense tip 360 therein. Such assembly is shown in FIGS. 1, 2, and 2A. Dispense tip assembly 350 comprises a plastic housing 355 having an outlet end 357 and tubular dispense tip 360 held therein. The tubular dispense tip 360, typically a hollow stainless steel tube of small inside diameter, is held clamped within plastic housing 355 so that the tubular dispense tip 360 extends out therefrom. The design shown best in FIG. 2A has the advantage that the entire dispense tip assembly can be replaced by simply removing it (by unscrewing) from housing extension 309. Similarly the valve lower housing 306 and internal support ring 327 may be removed from fluid dispense housing 372 to permit internal cleaning of the needle valve. Normally such internal cleaning may done quickly, e.g. within a few minutes. In a preferred needle valve applicator shown in the drawings, e.g. FIGS. 2 and 2A available from EFD Company (a Nordson Company) the valve seat 352 is located deep within the plastic housing 355 for tubular dispense tip 360. This feature gives better control over the dispensing of fluids through fine tubular dispense tips. Additionally modern needle valve applicators, as shown in FIG. 2, are fitted with a means for controlling the stroke distance of the needle rod 325 as piston 320 moves axially upward. This in turn establishes the distance that the end of needle 325 unseats from the inlet 352 (unseat gap) of tubular dispense tip 360 when the piston moves to its maximum upward stroke. A manually adjustable regulator knob 342 (FIG. 2) can be used to adjust the needle rod 325 maximum stroke distance. For example, as knob 342 is loosened the gap between piston stop 344 and piston 320 becomes greater. In such case the terminal end 326 of needle rod 325 unseats a greater distance from the inlet 352 of tubular dispense tip 360 as pressurized air is pulsed into inlet chamber 330. The actual amount of adhesive dispensed for a given valve opening time can be increased somewhat when the needle rod 325 stroke distance is set higher (resulting in greater gap between needle rod distal end 326 and tubular dispense tip inlet 352) as the needle rod unseats from dispense tip inlet 352.

Figure 2B:
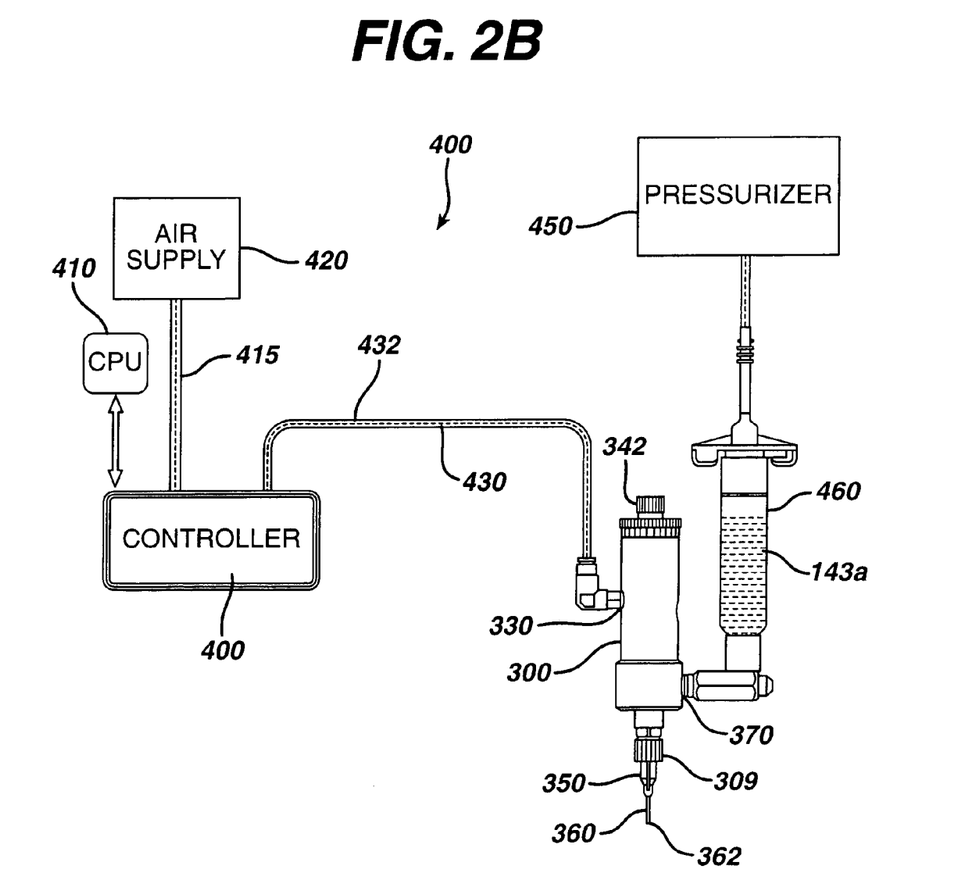
FIG. 2B is a schematic flow diagram showing air and adhesive supplied to the needle valve applicator and system controller for regulating the valve opening time.

An overall schematic of a typical operation of the needle valve applicator 300 is shown in FIG. 2B. This schematic is representative of the type of operation employed when using needle valve actuated applicator 300 described above. Desirably a controller 400 supplied by the needle valve manufacturer, e.g. EFD Company (a Nordson Company) is used principally to set the needle valve opening time per cycle. The controller may be programmed through connected computer 410. The needle valve opening time within applicator 300 corresponds to the time per cycle that pressurized air 432 is pulsed into the air inlet chamber 330 (FIGS. 2 and 2B). Typically the air is supplied to the controller 400 from a compressor or other supply source 420 through inlet line 415. The air 432 passes from controller 400 through outlet line 430 to air inlet chamber 330 of applicator 300. Air 432 is typically pulsed at a pressure of between about 70 and 90 psi to achieve opening of the needle valve within applicator 300 and dispensing of fluid (adhesive) from tubular dispense tip 360 during the pulse period. The adhesive fluid 143a is supplied to inlet dispense chamber 370 of applicator 300 in the form of a liquid solution or dispersion from a supply vat 460 which is pressurized by a pressurized air source 450.

In modern needle valve applicators as shown herein in FIG. 2, valve opening times as low as about 0.01 seconds may be achieved. Valve opening for much longer periods, for example, between about 0.01 to 5 seconds and up to 10 seconds or longer periods can be readily achieved. Essentially, the upper limit for the valve opening time can be set in controller 400 to any time as long as there will be a continuous supply of dispense fluid (adhesive) for that period.

In a preferred embodiment of the present invention individual cathode cans 240 may be mechanically fed to a turret wherein they are rotated (FIG. 1) at a preset speed. The valve 353 opening time may be set in controller 400 desirably in a range between about 0.1 and 0.6 seconds. The rotating speed of the cathode casing (can) 240 is synchronized so that the needle valve 353 opening time can be set to correspond to the duration of one revolution of the cathode can 240. During the valve 353 opening time adhesive sealant 143a is dispensed from tubular dispense tip 360. The cathode cans 240 may be rotated at speeds between about 1000 and 50 revolutions per minute, which corresponds to a speed of between about 0.06 and 1.20 seconds per revolution, respectively, and thus a synchronized valve 353 opening time of between about 0.06 and 1.20 seconds per cycle. Typically the cathode cans 240 are rotated at speeds between about 600 and 100 revolutions per minute, which corresponds to a speed of between about 0.1 and 0.6 seconds per revolution, respectively. Thus valve 353 opening time of between about 0.1 and 0.6 seconds per cycle can be preset to synchronize with such rotating speeds between about 600 and 100 revolutions per minute, respectively. Preferably cathode cans 240 are rotated at speeds between about 600 and 120 revolutions per minute, which corresponds to a speed of between about 0.1 and 0.5 seconds per revolution, respectively, and thus a synchronized valve 353 opening time of between about 0.1 and 0.5 seconds per cycle.

Alternatively, the needle valve applicator 300 may be attached to a turret. The cathode can 240 may then be fixed and the adhesive may be dispensed from dispense tip 360 within applicator 300, which rotates or revolves in an orbital path over the cathode can. In such embodiment one revolution of the applicator 300 over the cathode can 240 would allow application of adhesive in a complete ring, for example, to annular step 245a. The rotation speeds and valve opening times can be the same as above described in the preferred embodiment with the applicator 300 fixed and the cathode can 240 rotated beneath the applicator. Also both applicator 300 and cathode can 240 may be simultaneously rotated in an orbital path at different speeds. The relative speed between the two determines the valve opening time so that a continuous ring of adhesive may be applied to the inside surface of annular step 245 of cathode can 240. In this case the relative rotation speed between applicator 300 and cathode can 240 may be the same as the above indicated rotation speed with applicator 300 fixed and the cathode can 240 rotated.

In a specific application adhesive 143a can be dispensed from tubular dispense tip 360 in a continuous stream onto the inside surface 245a of recessed annular step 245 of cathode can 240 FIG. 1. The adhesive 143a is dispensed to form an even circumferential coating on step surface 245a, preferably during one revolution of the cathode can. It will be appreciated that valve 353 opening times may be adjusted so that adhesive 143a may coat only arcuate portions of step surface 245a if desired. Also it will be appreciated that a plurality of adhesive coatings 143a may be applied to surface 245a by rotating surface 245a more than one revolution. However, in the present application it is preferred to coat the cathode can annular step surface 245a with a single continuous ring of adhesive 143a. The valve may be kept open long enough for adhesive 143a to be applied to surface 245a for a bit over one complete revolution of said surface, for example, advantageously up to about 5 degrees over one complete revolution. From an operational standpoint this provides a safety margin to assure that adhesive coating 143a is applied effectively in at least one continuous ring, that is, at least one complete revolution of annular step surface 245a.

The cathode casing 240 (FIG. 1) has a body 242, an integral closed end 249 and an open end 247. The closed end 249 of the cathode casing (when the casing is held in vertical position with the closed end on top) typically has a raised portion 244 near its center. This raised portion 244 forms the positive terminal contact area and typically contains a plurality of air holes 243 therethrough. The cathode casing closed end 249 also typically has an annular recessed step 245 which extends from the peripheral edge 246 of the raised terminal portion 244 to the outer peripheral edge 248. Conventional zinc/air button cells can vary in diameter from between about 4 and 16 mm, more typically between about 4 and 12 mm. In such cells the annular recessed step 245 may typically have a width of about 30 mil (0.762 mm).

The width of recessed annular step 245a is thus very small for a typical button cell, for example, a button cell of size small enough for use as a hearing aid battery. The width of adhesive 143a applied to step 245a is desirably even smaller than the width of step surface 245a. The adhesive 143a must be applied accurately to step surface 245a. It is essential that no adhesive be inadvertently applied to or splattered onto any portion of the cathode can vertical wall 242 near the junction of step surface 245a. Adhesive which is inadvertently applied to such portion of vertical wall 242 will interfere with achieving the required close electrical contact between the cathode assembly 230 and cathode can 240. (Conversely, sealant splattered near the airholes etc. can block air access and sealant that soaks into the filter paper can also block air access.) In order to achieve the desired placement of adhesive coating 143a onto a typical cathode can annular step surface 245a, the width of such adhesive may desirably be between about 10 and 25 mil (0.254 and 0.635 mm). The preferred adhesive 143a for application to annular step surface 245a as herein described may be a solvent based polyamide adhesive liquid, however, other adhesives could also be employed. The thickness of such adhesive 143a (wet) applied to annular step surface 245a may typically be between about 20 and 40 micron (0.020 and 0.040 mm) and even higher. The thickness of such adhesive coating (dry) forming adhesive sealant layer 143 (FIG. 3) may typically be about 10 micron (0.010 mm) and even higher.

It is not apparent that liquid adhesive 143a can be applied accurately in such small width, e.g. between about 10 and 25 mil (0.254 and 0.635 mm) to a surface such as annular step 245a as cathode can 240 rotates at high speed, for example, between about 100 and 600 revolutions per minute. It has been determined by Applicants that such application of adhesive 143a can be applied in the required small width to annular step surface 245a by use of a needle valve dispense applicator 300. However, to achieve application of the adhesive in required small widths of application, for example, between about 10 and 25 mil (0.254 and 0.635 mm) the tubular dispense tip 360 desirably should have a very small aperture. That is, it has been determined that the inside diameter of tubular dispense tip 360 should desirably be between about 4 and 6 mil (0.102 and 0.152 mm). A needle valve applicator 300 of the type shown in FIG. 2 suitable for use in the present example of applying adhesive 143a to cathode can 240 annular step surface 245a (FIG. 1) is available from EFD Company (a Nordson Company). A preferred applicator 300 from EFD Company is available under the trade designation 741MD-SS needle valve applicator. It has been determined that the desired dispense width of adhesive 143a, for example, between about 10 and 25 mil (0.254 and 0.635 mm) can be achieved employing such needle valve applicator 300 together with a tubular dispense tip 360 having an inside diameter between about 4 and 6 mil (0.102 and 0.152 mm). A suitable tubular dispense tip 360 is available from EFD Company (a Nordson Company) as a 30 gage stainless steel tip having an inside diameter (I.D.) of 6 mil (0.15 mm) or as a 32 gage stainless steel tip having an inside diameter (I.D.) of 4 mil (0.10 mm). Such dispense tips 360 are available from EFD already fitted within the plastic housing 355 forming a replaceable dispense tip assembly 350. Such tip assemblies 350 are readily inserted into the needle valve applicator housing extension 309 (FIG. 2).

Various liquid adhesives 143a can be dispensed through needle valve applicator 300. However, it has been determined that a liquid adhesive of low viscosity of between about 150 and 250 centipoise is desirable. Such viscosity range makes it easier to dispense the liquid adhesive in a continuous stream through tubular dispense tips having the preferred small inside diameter, for example, between about 4 and 6 mil (0.10 and 0.15 mm). However, a liquid adhesive viscosity range between about 10 and 2000 centipoise is believed possible with suitable needle I.D. selection. The liquid adhesive 143a is preferably solvent-based adhesive solution comprising a polyamide resin, which dries to form adhesive layer 143 having a permanent adhesive bond with a contacting surface, as the solvent evaporates. In principle a solvent-based pressure sensitive adhesive could also be dispensed by the needle valve applicator 300 herein referenced. A preferred polyamide adhesive resin is available under the trade designation VERSAMID resin (General Mills Chemicals). Another preferred polyamide adhesive resin is available under the trade designation REAMID-100 from Specialty Chemicals. The VERSAMID or REAMID-100 resin is readily soluble in isopropylalcohol. Thus, a liquid adhesive solution having the desired viscosity between about 150 and 250 centipoise can be obtained by adjusting the amount of isopropylalcohol solvent blended with the VERSAMID or REAMID-100 resin. A preferred blend as used in the needle valve applicator 300 comprises 35 to 55 percent by weight adhesive resin solids and remainder isopropylalcohol. Other solvent-based adhesive systems can be employed for liquid adhesive 143a. For example, thermoplastic. block copolymers such as styrene-isoprene-styrene, styrene-butadiene-styrene, styrene-ethylene/butylene-styrene, styrene-ethylene/propylene-styrene and mixtures thereof all dissolved in an appropriate solvent could be used.

The zinc/air cell has a metal anode, typically comprising zinc and an air cathode. The cell is commonly referred to as a metal/air depolarized cell. The zinc/air cell of the invention is desirably in the form of a miniature button cell. It has particular application as a power source for electronic hearing aids. The miniature zinc/air button cell of the invention typically has a disk-like cylindrical shape of diameter between about 4 and 16 mm, preferably between about 4 and 12 mm and a height between about 2 and 9 mm, preferably between about 2 and 6 mm. The miniature zinc/air cell typically has an operating load voltage between about 1.2 volt to 0.2 volt. The cell typically has a substantially flat discharge voltage profile between about 1.1 and about 0.9 volt whereupon the voltage can then fall fairly abruptly to zero. The miniature button cell can be discharged at a rate between about 0.2 and 25 milli-Amp. The term "miniature cells" or "miniature button cells" as used herein is intended to include such small size button cells, but is not intended to be restricted thereto, since other shapes and sizes for small zinc/air cells are possible. For example, zinc air cells could also be produced in somewhat larger sizes having a cylindrical casing of size comparable to conventional AAAA, AAA, AA, C and D size $Zn/MnO_2$ alkaline cells, and even larger. The present invention is also intended to be applicable to such larger cell sizes and also to other cell shapes, for example, prismatic or elliptical shapes.

The zinc/air cell can contain added mercury, for example, about 3 percent by weight of the zinc in the anode or can be essentially mercury free (zero added mercury cell). In such zero added mercury cells there is no added mercury and the only mercury present is in trace amounts naturally occurring with the zinc. Accordingly, the cell of the invention can have a total mercury content less than about 50 parts per million parts of total cell weight, preferably less than 20 parts per million of total cell weight, more preferably less than about 10 parts per million of total cell weight. (The term "essentially mercury free" as used herein shall mean the cell has a mercury content less than about 50 parts per million parts of total cell weight.) The cell of the invention can have a very small amount of lead additive in the anode. If lead is added to the anode, the lead content in the cell can typically be between about 100 and 600 ppm of total metal content in the anode. However, the cell desirably does not contain added amounts of lead and thus can be essentially lead free, that is, the total lead content is less than 30 ppm, desirably less than 15 ppm of the total metal content of the anode.

The zinc/air cell 210 and components therein is the same or similar to that described in the specific embodiment in commonly assigned U.S. Pat. No. 6,436,156 B1 and U.S. Pat. No. 6,610,353 B1 except that adhesive coating 143 is applied by the needle valve application method herein described. The adhesive composition is as set forth in the present specification. The zinc/air cell 210 (FIG. 3) has an anode casing 260, a cathode casing 240, and electrical insulator material 270 therebetween. The anode casing 260 has body 263, an integral closed end 269, and an open end 267. The cathode casing 240 has a body 242, an integral closed end 249 and an open end 247. The closed end 249 of the cathode casing (when the casing is held in vertical position with the closed end on top) typically has a raised portion 244 near its center. This raised portion 244 forms the positive terminal contact area and typically contains a plurality of air holes 243 therethrough. The cathode casing closed end 249 also typically has an annular recessed step 245 which extends from the peripheral edge 246 of the raised terminal portion to the outer peripheral edge 248.

Figure 3:
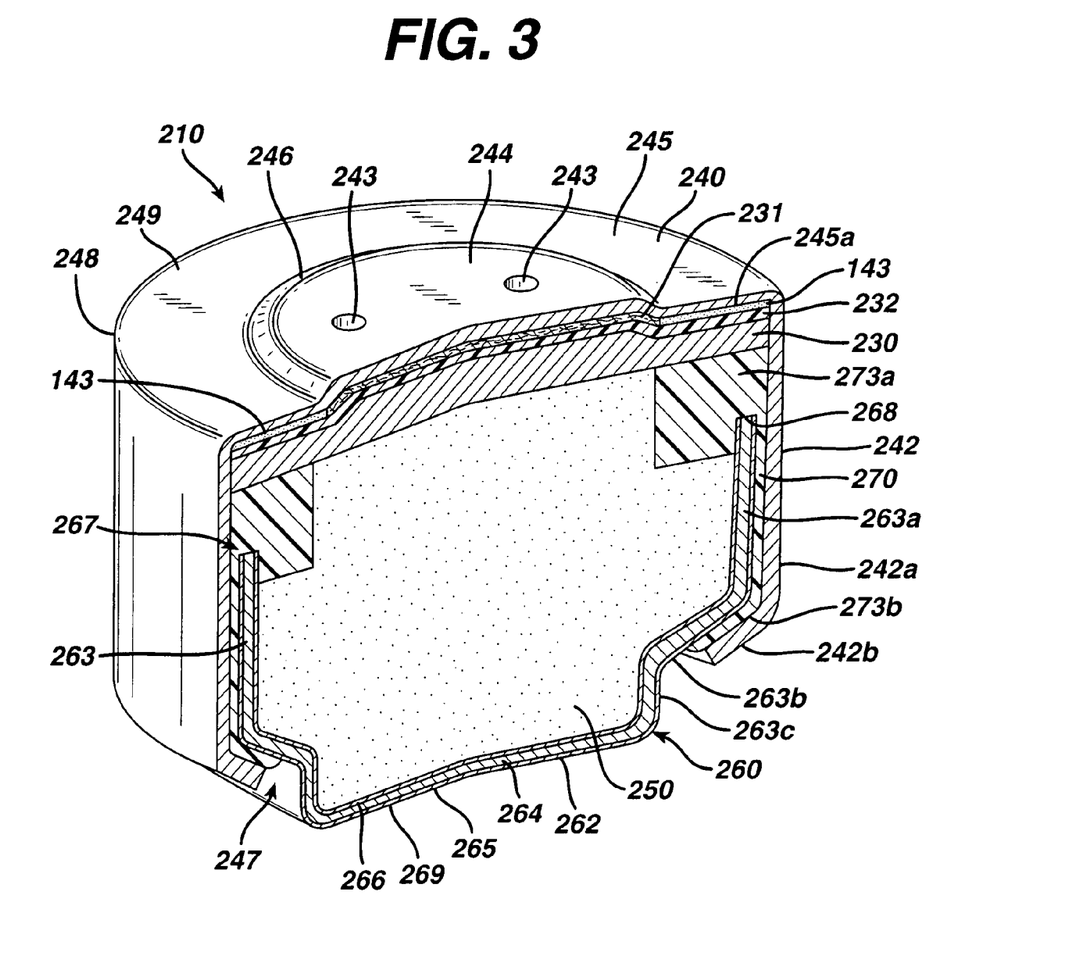
FIG. 3 is an isometric cross sectional view of an embodiment of the zinc/air cell of the invention with adhesive sealant.

The anode casing 260 contains an anode mixture 250 comprising particulate zinc and alkaline electrolyte. The particulate zinc is desirably alloyed with between about 100 and 1000 ppm indium. The cathode casing 240 has a plurality of air holes 243 in the raised portion 244 of its surface at the closed end thereof. A cathode catalytic assembly 230 containing a catalytic composite material 234 (FIG. 4) is placed within the casing proximate to the air holes. During cell discharge, the catalytic material 234 facilitates the electrochemical reaction with ambient oxygen as it ingresses through air holes 243. An adhesive sealant 143a is applied along a portion of the inside surface of cathode casing 240 as shown in FIG. 1. Adhesive sealant dries to form adhesive layer 143 (FIG. 3). In a preferred embodiment the adhesive is applied using a needle valve applicator 300 in the manner as above described. The adhesive 143a is applied as a liquid in a continuous ring on the inside surface 245a of recessed annular step 245 at the closed end 249 of the casing as shown in FIG. 1. The adhesive sealant dries to form adhesive layer 143

(FIG. 3). If the closed end of the cathode casing is flat, that is, does not have a recessed step 245, the adhesive sealant 143 can be applied to the inside surface of the closed end 249 adjacent the outer peripheral edge 248 of said closed end. In such latter case the adhesive sealant 143 is desirably applied as a continuous ring to the inside surface of closed end 249 such that the continuous ring of adhesive 143 has an outside diameter of between about 75 percent and 100 percent, preferably between about 90 and 100 percent, more preferably between about 95 and 100 percent of the inside diameter of closed end 249. The adhesive ring is preferably applied in a narrow band so that the majority of cathode material 234 is exposed to the incoming air supply.

Figure 4:
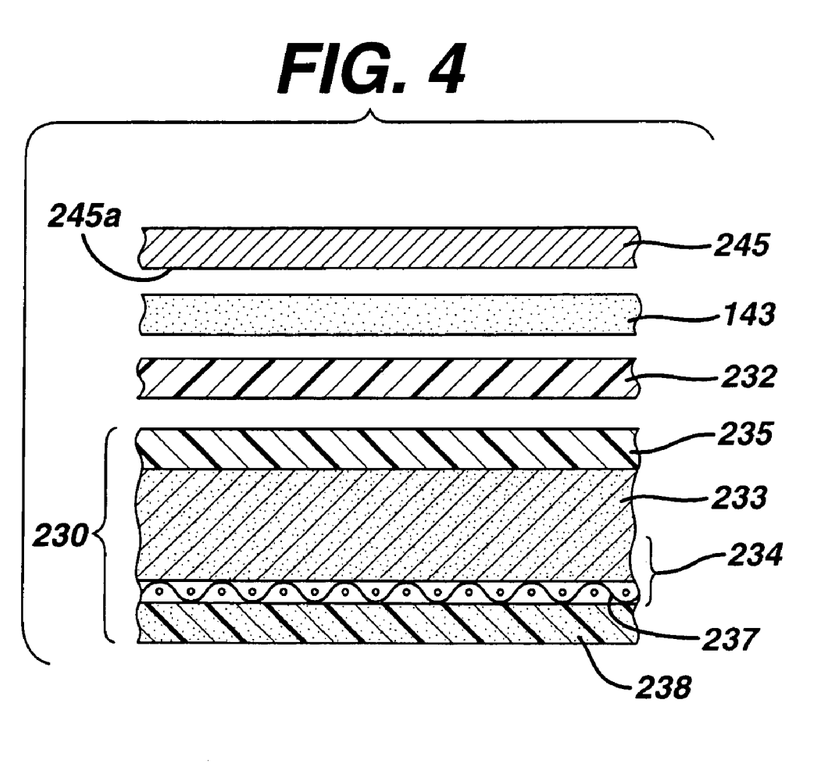
FIG. 4 is an exploded view of a preferred embodiment of the catalytic cathode assembly and adhesive sealant shown in FIG. 3.

A cathode catalytic assembly 230 (FIGS. 3 and 4) can be formed by laminating a layer of electrolyte barrier film material 235, preferably TEFLON polymer (tetrafluoroethylene), to one side of the catalytic composite material 234 and an ion permeable separator material 238 to the opposite side. The electrolyte barrier film 235, preferably of TEFLON polymer, has the property that it is permeable to air, yet is hydrophobic, and prevents electrolyte from passing therethrough. The edge of cathode catalytic assembly 230 can be applied to said adhesive ring 143 on step 245 thereby providing a permanent adhesive seal between the cathode composite 234 and casing step 245. In a specific embodiment the cathode catalytic assembly 230 can be applied to adhesive 143 on step 245 with the electrolyte barrier 235 contacting the adhesive. In a preferred embodiment a separate electrolyte barrier sheet 232, preferably of TEFLON polymer, can be applied to adhesive ring 143 on the inside surface of step 245, thereby bonding electrolyte barrier sheet 232 to the inside surface 245a of step 245. The catalytic assembly 230 can then be applied over electrolyte barrier sheet 232, preferably with the surface of second electrolyte barrier sheet 235, preferably of TEFLON polymer, contacting the barrier sheet 232 (FIG. 4). The barrier sheet 232 when bonded with adhesive 143 to the inside surface of step 245, particularly in combination with a second barrier sheet 235 (FIG. 4) being applied against barrier sheet 232, provides a very effective seal preventing electrolyte from migrating around the edge of catalytic assembly 230 and gradually leaking out of air holes 243. The use of adhesive sealant 143 also reduces the amount of crimping force needed during crimping the outer peripheral edge 242b over the anode casing body. This is particularly advantageous when thin walled casings thickness such as between about 0.001 inches (0.0254 mm) and 0.015 inches (0.38 mm), typically between about 0.002 inches (0.0508 mm) and 0.010 inches (0.254 mm) or thin catalytic cathode assemblies 230 are employed, since high crimping forces could possibly distort or crack such thin casings and cathode assemblies.

A preferred embodiment of a zinc/air cell of the invention is shown in FIG. 3. The embodiment shown in FIG. 3 is in the form of a miniature button cell. The cell 210 comprises a cathode casing 240 (cathode cup) an anode casing 260 (anode cup) with an electrical insulator material 270 therebetween. The insulator 270 can desirably be in the form of a ring, which can be inserted over the outside surface of the anode casing body 263 as shown in FIG. 3. Insulator ring 270 desirably has an enlarged portion 273a extending beyond peripheral edge 268 of the anode casing (FIG. 3). The insulator 270 with enlarged portion 273a prevents anode active material from contacting the cathode casing 240 after the cell is sealed. Insulator 270 is of a durable electrically insulating material such as high density polyethylene, polypropylene or nylon which resists flow (resists cold flow) when squeezed.

The anode casing 260 and cathode casing 240 are initially separate pieces. The anode casing 260 and cathode casing 240 are separately filled with active materials, whereupon the open end 267 of the anode casing 260 can be inserted into the open end 247 of cathode casing 240. The anode casing 260 is characterized by having a first straight body potion 263a of maximum diameter which extends vertically downwardly (FIG. 3) from peripheral edge 268 to a point which is more than at least 50% of the anode casing 260 height whereupon the casing is slanted inwardly to form slanted midportion 263b. There is a second straight portion 263c extending vertically downwardly from the terminal end of midportion 263b. The second straight portion 263c is of smaller diameter than straight portion 263a. The portion 263c terminates with a 90° bend forming the closed end 269 having a relatively flat negative terminal surface 265. The body 242 of cathode casing 240 has a straight portion 242a of maximum diameter extending vertically downwardly from closed end 249. The body 242 terminates in peripheral edge 242b. The peripheral edge 242b of cathode casing 240 and underlying peripheral edge 273b of insulator ring 270 are initially vertically straight and can be mechanically crimped over the slanted midportion 263b of the anode casing 260. This locks the cathode casing 240 in place over the anode casing 260 and forms a tightly sealed cell.

Anode casing 260 can be separately filled with anode active material by first preparing a mixture of particulate zinc and powdered gellant material. The zinc average particle size is desirably between about 30 and 350 micron. The zinc can be pure zinc but is preferably in the form of particulate zinc alloy with indium. The zinc can also be in the form a particulate zinc alloyed with small amounts of indium and lead. The alloy material typically comprises less than about 0.1 wt % of the zinc. These particulate zinc alloys are thus essentially comprised of pure zinc and have the electrochemical capacity essentially of pure zinc. Thus, the term "zinc" shall be understood to include such materials. The gellant material can be selected from a variety of known gellants which are substantially insoluble in alkaline electrolyte. Such gellants are reported in the art for admixture with particulate zinc for use in alkaline cells including zinc/air cells. A typical gelling agent, may be a cross linked carboxymethyl cellulose (CMC) or cross linked polyacrylic acid polymer available under the trade designation Carbopol C940 (B.F. Goodrich). Other gelling agents are commonly used, for example, in the form of hydrolyzed polyacrylonitrile grafted unto a starch backbone available under the designation Waterlock A221 (Grain Processing Corp.). A dry mixture of the particulate zinc and gellant powder can be formed with the gellant forming typically between about 0.1 and 1 percent by weight of the dry mixture. A solution of aqueous KOH electrolyte solution comprising between about 30 and 40 wt % KOH and about 2 wt % ZnO is added to the dry mixture and the formed wet anode mixture 250 can be inserted into the anode casing 260.

A catalytic cathode assembly 230 (FIGS. 3 and 4) and air diffuser 231 can be inserted into casing 240 as follows: An air diffuser disk 231 (FIG. 3), which can be in the form of an air porous filter paper or porous polymeric material can be inserted into the cathode casing 240 so that lies against the inside surface of the raised portion 244 of the casing against air holes 243. An adhesive sealant ring 143 is applied to the inside surface of recessed step 245 at the closed end of the cathode casing. A separate electrolyte barrier layer 232 (FIGS. 3 and 4), for example, of polytetrafluoroethylene TEFLON polymer can optionally be inserted over the air diffuser 231 so that the edge of the barrier layer 232 contacts adhesive ring 143. Barrier layer 232 is permeable to air but not permeable to the alkaline electrolyte or water. The adhesive ring 143 thus permanently bonds the edge of barrier layer 232 to the inside surface of recessed step 245. The adhesive ring 143 with barrier layer 232 bonded thereto prevents electrolyte from migrating from the anode to and around cathode catalytic assembly 230 and then leaking from the cell through air holes 243. A catalytic cathode assembly 230 as shown in FIG. 4 can be prepared as a laminate comprising a layer of electrolyte barrier material 235, a layer of cathode catalyst composite 234 under the barrier layer 235 and a layer of ion permeable separator material 238 under the catalyst composite 234, as shown in FIG. 4. The separator 238 can be selected from conventional ion permeable separator materials including cellophane, polyvinylchloride, acrylonitrile, and microporous polypropylene. Each of these layers can be separately prepared and laminated together by application of heat and pressure to form the catalytic assembly 230. The electrolyte barrier layer 235 can desirably be of polytetrafluoroethylene TEFLON polymer. The catalytic assembly 230 can then be applied over electrolyte barrier sheet 232 (FIG. 4), preferably with the surface of barrier TEFLON polymer sheet 235 contacting the barrier sheet 232.

Catalytic cathode composite 234 desirably comprises a catalytic cathode mixture 233 of particulate manganese dioxide, carbon, and hydrophobic binder which is applied by conventional coating methods to a surface of an electrically conductive screen 237, preferably a nickel mesh screen. Other catalytic materials may be included or employed such as metals like silver, platinum, palladium, and ruthenium or other oxides of metals or manganese (e.g., $MnO_x$ or $Mn_xO_y$) and other components known to catalyze the oxygen reduction reaction. During application the catalytic mixture 233 is substantially absorbed into the porous mesh of screen 237. The manganese dioxide used in the catalytic mixture 233 can be conventional battery grade manganese dioxide, for example, electrolytic manganese dioxide (EMD). The carbon used in preparation of mixture 233 can be in various forms including graphite, carbon black and acetylene black. A suitable hydrophobic binder can be polytetrafluoroethylene TEFLON polymer. The catalytic mixture 233 may typically comprise between about 5 and 15 percent by weight $MnO_2$, 30 and 50 percent by weight carbon, and remainder binder. During cell discharge the catalytic mixture 233 acts primarily as a catalyst to facilitate the electrochemical reaction involving the incoming air. However, additional manganese dioxide can be added to the catalyst and the cell can be converted to an air assisted zinc/air or air assisted alkaline cell. In such cell, which can be in the form of a button cell, at least a portion of manganese dioxide becomes discharged, that is, some manganese is reduced during electrochemical discharge along with incoming oxygen. The adhesive ring 143 and method of application herein described is intended to be applicable for use as well in such air assisted cells to prevent leakage of electrolyte therefrom.

After the air diffuser 231 and catalytic assembly 230 are inserted into casing 240 with either barrier layer 235 or alternatively barrier layer 232 adhered to adhesive ring 143, the anode casing 260 is filled with anode material 250. The open end 267 of the filled anode casing 260 can be inserted into the open end 247 of cathode casing 240. The peripheral edge 242b of the cathode casing can be crimped over the slanted midportion 263b of the anode casing with insulator 270 therebetween, as above described.

In the preferred embodiment (FIG. 3) the anode casing 260 has a layer of copper 266 plated or clad on its inside surface so that in the assembled cell the zinc anode mix 250 contacts the copper layer. The copper plate is desired because it provides a highly conductive pathway for electrons passing from the anode 250 to the negative terminal 265 as the zinc is discharged. The anode casing 260 is desirably formed of stainless steel, which is plated on the inside surface with a layer of copper. Preferably, anode casing 260 is formed of a triclad material composed of stainless steel 264 with a copper layer 266 on its inside surface and a nickel layer 262 on its outside surface as shown in FIG. 3. Thus, in the assembled cell 210 the copper layer 266 forms the anode casing inside surface in contact with the zinc anode mix 250 and the nickel layer 262 forms the anode casing's outside surface.

The copper layer 266 desirably has a thickness between about 0.0002 inches (0.005 mm) and 0.002 inches (0.05 mm). The stainless steel typically has a thickness between about 0.001 inches (0.0254 mm) and 0.01 inches (0.254 mm) and the nickel layer between about 0.0001 inches (0.00254 mm) and 0.001 inches (0.0254 mm). The total wall thickness of the anode casing 260 composed of the triclad material can be desirably between about 0.001 inches (0.0254 mm) and 0.015 inches (0.38 mm).

A miniature zinc/air cell can then be prepared having the components as above described (FIG. 3) including adhesive ring 143 on the inside surface of step 245. A separate electrolyte barrier layer 232 of TEFLON polymer can be bonded to the inside surface of step 245 using adhesive ring 143. By way of a specific example (not intended to be limiting as to cell size), the cell can be a standard size 635 zinc/air cell have an overall diameter of about 0.608 inches (15.4 mm) and a height (positive to negative terminal) of about 0.314 inches (7.98 mm). (Such dimensions are within the standards for such size cell as set by the International Electrochemical Commission—IEC.) The cathode casing 240 can be nickel plated steel having a wall thickness of about 0.01 inches (0.25 mm). The cathode catalyst composite 237 can have the following composition: $MnO_2$ 5 wt. %, carbon black 15 wt %, TEFLON polymer binder 18 wt. %, and nickel mesh screen, 62 wt. %. The anode 250 can contain zero added mercury (mercury content can be less than 20 ppm of cell weight) and can have the following composition: zinc 78 wt % (the zinc can be alloyed with less than about 0.1 wt. % of indium), electrolyte (35-40 wt % KOH and 2 wt % ZnO) 2 wt. %, and remainder gelling agent. The total anode 250 (zinc/gelling agent mix plus electrolyte) can be 2.4 g.

By way of another specific non limiting example, the cell size could be a standard size 312 zinc/air cell having an outside diameter of between about 0.3025 and 0.3045 inches (7.68 and 7.73 mm) and a height of between about 0.1300 and 0.1384 inches (3.30 and 3.52 mm). The casing 240 wall thickness for both size cells can be, for example, 0.004 inches (0.10 mm). The composition of the 312 size cell can be as above described with reference to the 635 size cell except that the total amount of active material would be adjusted to the volume of the 312 cell size. The process of the invention of applying liquid adhesive sealant 143a and the preferred width and thickness of the adhesive sealant (wet and dry) as described herein can apply equally as well to such different cell sizes. As above indicated the process of the invention is desirably applicable to miniature zinc/air button cells typically having a disk-like cylindrical shape of diameter between about 4 and 16 mm, preferably between about 4 and 12 mm and a height between about 2 and 9 mm, preferably between about 2 and 6 mm.

There may be one or more assembly lines running in parallel, each with its own applicator 300 with independent dispense tip 360 and target surface such as a separate cathode can 240 passing thereunder. The dispense operation can be in essentially continuous operation for long periods, for example, at least 24 hours or longer periods. If the dispense tip 360 clogs the assembly is shut down so that the tip 360 may be replaced, which takes only one or two minutes.

Although the invention has been described with reference to specific embodiments, it should be appreciated that other embodiments are possible without departing from the concept of the invention. Thus, the invention is not intended to be limited to the specific embodiments, but rather the claims and equivalents reflect its scope.

What is claimed is:

1. A method of applying a liquid adhesive to a portion of the inside surface of a cathode casing for a zinc/air cell, said liquid adhesive comprising a thermoplastic polyamide resin, comprising:
    rotating said surface beneath an applicator having a pneumatically piston actuated needle valve therein for dispensing said adhesive, wherein said needle valve operatively engages the inlet end of a tubular dispense tip, wherein said tubular dispense tip is elongated and extends form and beyond said needle valve, so that when the valve is open said liquid adhesive passes form the applicator through said dispense tip onto said rotating surface; and
    applying said adhesive comprising a polyamide resin through said applicator onto a portion of said rotating surface, wherein the cathode casing is in the form of a can having an open end and a closed end and said liquid adhesive passes from said applicator to the inside surface of said closed end;
    wherein said inside surface of the closed end of the cathode casing is flat along an annular path spanning a revolution of the cathode casing and said liquid adhesive having a viscosity between about 150 and 250 centipoise passes form said applicator through said dispense tip to the inside surface of said closed end of the cathode casing thereby covering said flat annular path with at least one continuous ring of adhesive;
    wherein said inside surface rotates at a speed of between about 100 and 600 revolutions per minute relative to said applicator;
    wherein said valve opening time is between about 0.1 and 0.6 seconds to dispense said adhesive onto said rotating surface;
    where in said liquid adhesive from said tubular dispense tip coats said inside surface of the closed end of said cathode casing in an annular coating width between about 10 and 25 mil (0.245 and 0.635 mm); and
    applying a porting of an electrolyte barrier sheet of polytetrafluoroethylene to the adhesive on the inside surface of said flat annular path thereby bonding said electrolyte barrier sheet to the inside surface of the closed end of the cathode casing.

2. The method of claim 1 wherein a central portion of said closed end of the cathode casing forms the cell's positive terminal and said positive terminal is surrounded by a recessed annular step and said liquid adhesive passes from said applicator to the inside surface of said recessed annular step.

3. The method of claim 1 wherein said adhesive comprises a thermoplastic polyamide resin being the reaction product of dimerized fatty acids and diamines.

4. The method of claim 1 wherein said tubular dispense tip has an inside diameter between about 4 and 6 mil (0.10 and 0.15 mm).

5. The method of claim 1 wherein said surface rotates at a speed of between about 120 and 600 revolutions per minute relative to said applicator.

6. The method of claim 1 wherein the valve opening time is between about 0.1 and 0.5 seconds as said liquid adhesive passes from said tubular dispense tip onto said rotating surface.

7. The method of claim 1 wherein the adhesive is applied in at least one continuous ring to said rotating surface, said adhesive ring having up to about a 5 degree overlap portion.

8. The method of claim 1 wherein a catalytic cathode comprising manganese dioxide is applied over the electrolyte barrier sheet so that the barrier sheet is between the inside surface of said closed end of the cathode casing and the catalytic cathode.

9. The method of claim 2 wherein said cell is a button cell.

* * * * *